MONITORING SYSTEM FOR DETERMINING LISTENING HABITS OF WAVE SIGNAL RECEIVER USERS

Filed Oct. 18, 1956

2 Sheets-Sheet 1

INVENTORS
ROBERT L. FREEMAN AND
HENRY A. RAHMEL
BY
Mason, Kolehmainen, Rathburn and Wyss
ATTORNEYS INVENTORS
ROBERT L. FREEMAN AND
HENRY A. RAHMEL
BY
Mason, Kolehmainen, Rathburn and Wyss.
ATTORNEYS 2,957,046

MONITORING SYSTEM FOR DETERMINING LISTENING HABITS OF WAVE SIGNAL RECEIVER USERS

Robert L. Freeman, Glenview, and Henry A. Rahmel, Evanston, Ill., assignors to A. C. Nielsen Company, Chicago, Ill., a corporation of Delaware Filed Oct. 18, 1956, Ser. No. 616,749

6 Claims. (Cl. 179—2)

The present invention relates to monitoring systems and more particularly to monitoring systems which are particularly suited for determining the listening habits of wave signal receiver users and also for ascertaining certain ones of the purchasing habits of the public. Although the invention in its broader aspects may be employed in the collection of information in regard to certain habits of individuals, it is particularly suited for recording the operating conditions of television and radio receivers and, therefore, is described in connection with the monitoring and recording of the listening habits of television receiver users.

Generally speaking, the effectiveness of any television program as an advertising media is directly related to the average size of the listening audience, the average period of listening to the program by that audience, and the variations in size of the listening audience on a periodic basis. The latter information, namely, the periodic variations in the audience, permit the detection of program components which cause audience gains or losses, determination of the types of commercial messages which cause audience loss, and the optimum location of commercial messages during the program. In order to provide a market research organization with the necessary data from which all of the above information can be deduced, it is necessary to obtain a minute-to-minute record of the operating conditions of each receiver being monitored. It has been found that the listening habits of the public-at-large may be ascertained by monitoring a relatively few receivers. For example, by monitoring the receivers in 300 properly selected homes the listening habits of an entire city may be approximated with a high degree of accuracy. If economically feasible, it would also be desirable to transmit this data to the research organization on a day-to-day basis.

One of the first attempts to monitor home radio receivers utilized the so-called "telephone call messages" technique which involves the making of hundreds of personal calls to random selected homes during the period when a particular program is in progress and statistically analyzing the results of these telephone calls to determine the extent of listening. Although the information obtained by such a method is better than no information at all, because of many inherent defects in the method, which include the uncontrolled uncertainties which are introduced by human judgment, the accuracy of the results so obtained is not great. In fact, it is entirely impossible to obtain any useful information concerning most of the factors given above when the telephone-call method of monitoring is used.

Because both the network and so-called "sponsors" of radio and television programs are desirous of obtaining accurate information as to the relative effectiveness of the programs which they sponsor, more accurate instrumented methods of sampling which do not require active audience collaboration have been necessarily resorted to so as to provide considerably more information than is accumulated by the telephone call sampling technique and, moreover, entirely to eliminate the errors of human judgment associated with the personal contact types of sampling methods.

The instrumented methods or systems for monitoring receivers are in general of two types: the first utilizes a plurality of recorders respectively located directly at a plurality of receivers to be monitored, and the second utilizes a single recorder to which information is automatically transmitted, either periodically or instantaneously from each monitored receiver. In the second system the recorder is located at the central office where the information is accumulated and tabulated for use by program analysis organizations. The difficulty with the first of these systems has been that the information recorded at each receiver must be removed and transmitted to the central office either by means of the postal system or by means of collectors who periodically canvass the monitored homes to pick up the records, and, as a result, there is an appreciable time delay between the time the record is actually made and the time that the program survey organization receives the data for processing. Although the second method has the important advantage that it is much faster than the first method it suffers from the disadvantage that a signal link must be provided for each home being monitored and, for example, when telephone lines are used to transmit the information from the receivers to the central office the cost of leasing the lines is excessive.

Therefore, a principal object of the present invention is to provide a new and improved system for monitoring certain habits of a selected group of persons.

Another object of the present invention is to provide a new and improved system and apparatus for monitoring the use and operation of one or more wave signal receivers.

A further object of the present invention is to provide a wave signal receiver monitoring system which automatically records the operating condition of wave signal receiver users on a minute-to-minute basis and which conveys this recorded information at periodic intervals to a central office at relatively low cost.

A still further object of the present invention is to provide a new and improved apparatus and system for accurately determining the listening habits of wave signal receiver users.

Briefly, the above and further objects are realized in accordance with the present invention by providing at each of a large number of receivers a monitoring attachment which includes a combined recorder and playback or a recorder-reproducer unit and which records binary coded signals which are indicative of the operating conditions of each associated receiver with respect to time. A central office or signalling point located remotely with respect to the receivers is adapted to be selectively connected to the receivers through a suitable signal link such, for example, as a telephone system, and the binary coded signals which are initially recorded at a slow speed are played back over the signal link to the central office at a considerably greater speed than that at which they were recorded. Accordingly, a complete minute-by-minute record of each receiver operating condition may be frequently provided at the central office without the provision of signal links continuously connected between the central office and each of the monitored receivers. When the system of this invention is employed, the signal links between the central office and the homes may be parts of a regular telephone system with subscriber lines going to each of the receivers and to the central station.

Further objects and advantages and a better understanding of the present invention may be had by reference to the following detailed description taken in connection with the accompanying drawings, in which.

Figures 3, 4:
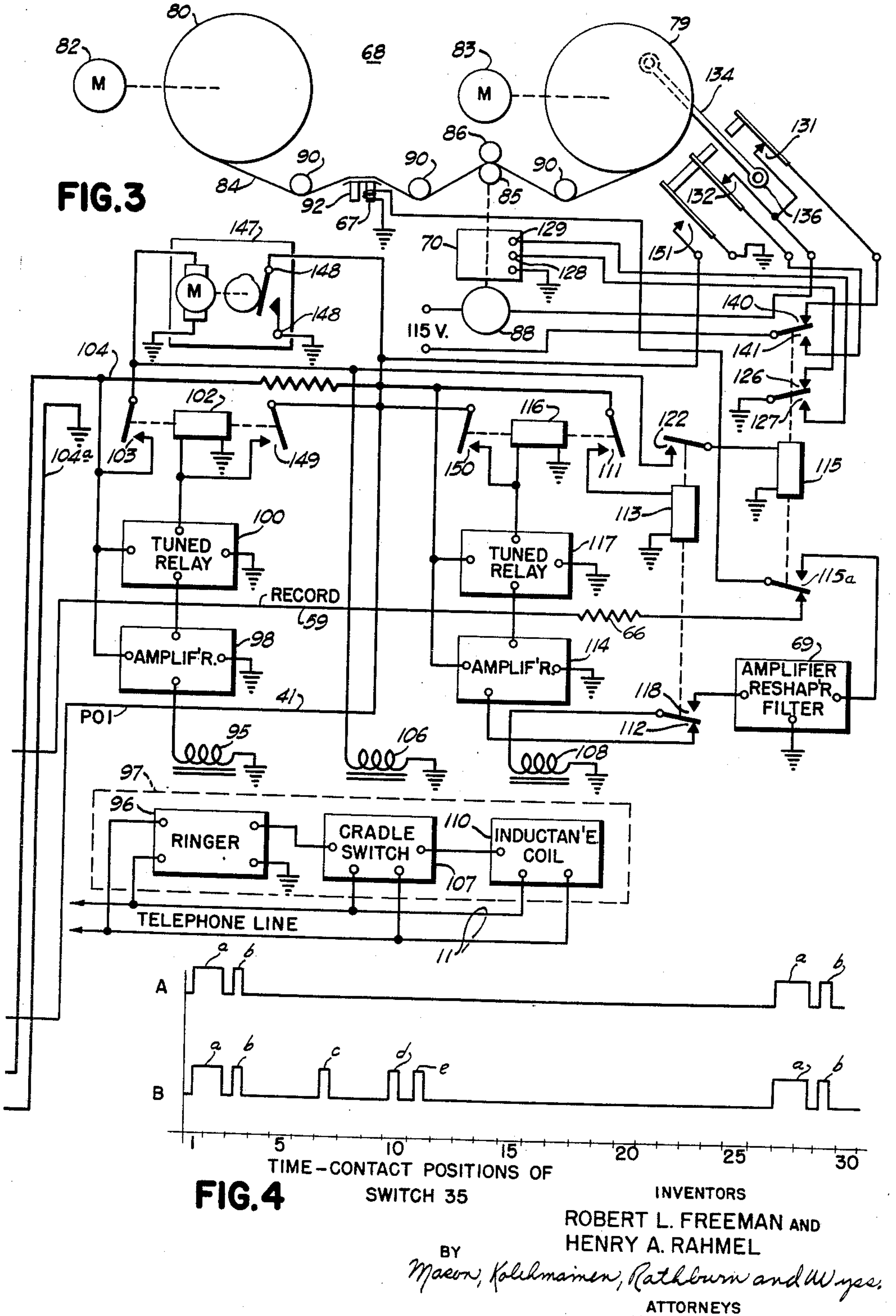

Fig. 3 diagrammatically illustrates that portion of the system which is located at the home; and Fig. 4 is a series of waveforms of voltage useful in understanding the operation of the system of the present invention.

Figure 1:
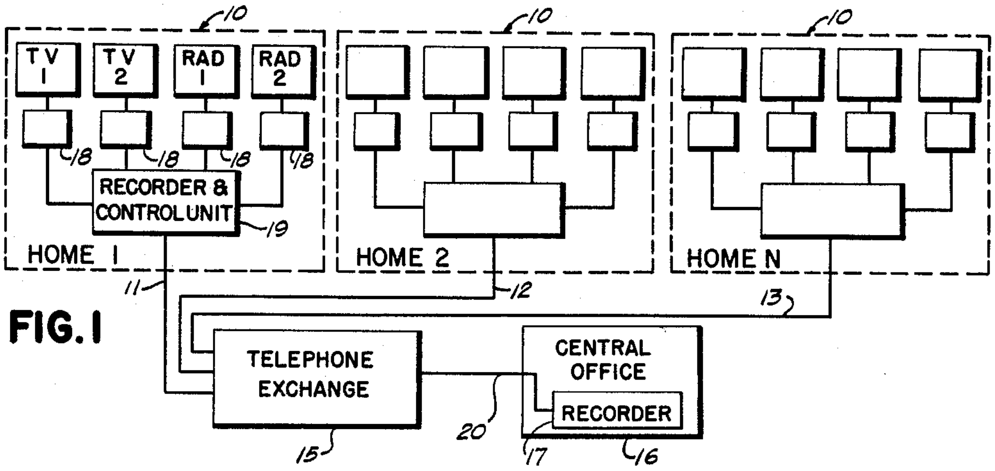
Fig. 1 is a block diagram of the overall monitoring system of the present invention.

Referring now to the drawings and partcularly to Fig. 1, there is shown a plurality of homes 10 respectively connected through telephone lines or signalling wires 11, 12 and 13 to a telephone exchange 15 through which information from each home is delivered to a central office 16 where it is recorded and passed on to a program survey organization. Since the equipment located in each of the homes being monitored is identical, only that equipment which is provided in home 1 is described in detail.

Therefore, referring to that portion of the system which is indicated as home 1, it will be seen that there is provided a plurality of wave signal receivers designated as TV–1, TV–2, RAD–1 and RAD–2, these four units respectively providing two television receivers and two radio receivers, being simultaneously monitored so as to provide a complete record of the listening habits of the individuals who live in home 1. A plurality of metering units 18 are each respectively connected to one of the wave signal receivers so as to provide a binary coded electrical output signal representative of the operating condition of the associated receiver. The electrical output signals from the meters 18 are coupled to a recorder and control unit 19 where the binary coded electric signals from the meters 18 are recorded with respect to time on a suitable recording or recorder receiving medium such as, for example, a magnetic tape, a magnetic wire, or a magnetic drum, the recording medium being continuously driven by suitable means such as a clock motor.

The equipment at the home also includes means which is responsive to the reception over the telephone line 11 of a predetermined signal from the central office 16 so as to cause the recorder and control unit 19 which is commonly termed a recorder-reproducer to play back, thereby to transmit the reproduced information to the central office where it is again recorded by any suitable means 17 such as a magnetic tape recorder or a printing unit.

In order to reduce the time that the telephone system must be utilized, the recorder and control unit 19 is operated at a considerably higher speed during playback than it is during the recording operation. The initial recording of the operating condition signals in the form of binary pulses enables this high speed playback without loss of information. It has been found that all of the information which has been gathered throughout a twenty-four hour period may be conveyed to the central office in a matter of minutes over a conventional telephone system and the playback operation may, if desired, be initiated during those periods when the telephone system is least used as, for example, in the early hours of the morning. It will be apparent that the telephone lines 11, 12 and 13 and the telephone exchange 15 are only small parts of the telephone system which services the locality in which the data are being collected, and the lines 11, 12 and 13 are regular subscriber lines which may be used solely by the market research organization or commonly used by that organization and the collaborator. Inasmuch as the research organization would only use each subscriber line for a few minutes each day, those few minutes being during the very early hours of the morning, no inconvenience to the collaborator would result. A subscriber line 20 is also connected between the central office 16 of the survey organization and the telephone exchange 15 so that the central office may be selectively connected to any one of the homes 10 to collect the information reproduced from the recorder and control units 19. Inasmuch as the information from the homes 10 need be supplied to the central office only once during every twenty-four hour period and then only for a very short period of time, subscriber lines may be and are preferably used since the rental cost thereof is considerably less than that of leased lines which are required in the continuous types of monitoring systems mentioned above.

Figure 2:
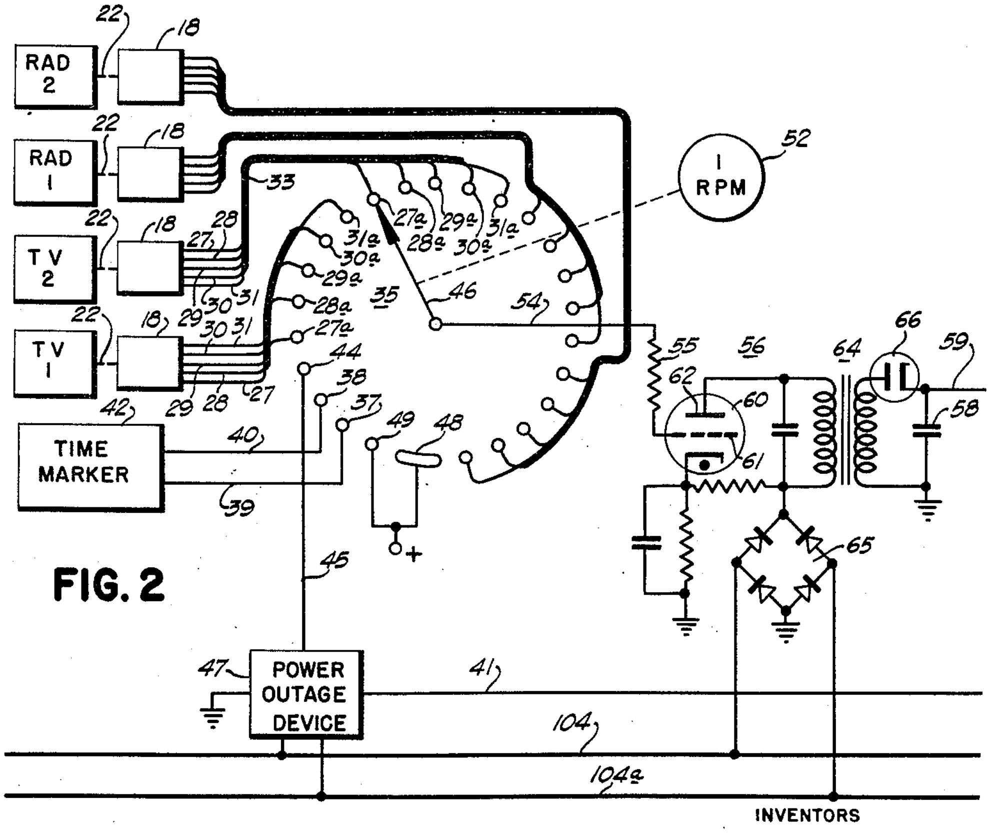
Fig. 2 is a schematic circuit diagram of a portion of the system illustrated in Fig. 1.

As illustrated in Fig. 2, the attachments which are located in the homes 10 each include the unit 18 which is connected to the receiver tuning shaft by a mechanical link 22. Specifically, this mechanical link is preferably connected to a selector switch in the unit 18 for placing a voltage on one of a plurality of conductors in accordance with the tuning condition of the associated receiver. One such conductor is provided for each station or channel to be monitored, and, therefore, the tuning condition of the receiver is indicated by the particular conductor which is energized. In order to facilitate the rapid transmission of this information to the central office, a resistor matrix of the type disclosed in copending application, Serial No. 381,344, filed September 1953, now Patent No. 2,881,417, in the name of Charles H. Currey and assigned to the same assignee as the present invention, may be employed in the unit 18 to convert the decimal type tuning condition signal to a binary coded signal. As is described in the above-identified application, fifteen different stations may be monitored by a system utilizing only four output conductors.

In accordance with the present invention, therefore, five output conductors 27, 28, 29, 30 and 31 are provided for each unit 18, the signal on four of the conductors 28–31 indicating the tuning condition of the associated receiver and the signal on the conductor 27 providing an indication as to the condition of energization of the receiver or, in other words, the "on" or "off" condition. In the illustrated embodiment of the invention, the conductors 27–31 are energized with alternating voltage but it will be understood that direct voltage may be used for this purpose if expedient. The five conductors 27–31 are respectively connected to five adjacent contacts or segments **27*a*, 28*a*, 29*a*, 30*a* and 31*a* of a multiple contact rotary switch 35. Similarly, five other adjacent contacts on the switch 35 are respectively provided for each of the attachments 18 used in a single home. In the illustrated embodiment of the invention where four receivers are monitored, there are four such sets of five contacts provided on the switch 35 and each set of contacts is connected through the associated conductors to one of the units 18**.

In addition to the contacts or segments on the switch 35 which are connected to the units 18, a plurality of additional segments are provided for recording other necessary information upon the recording medium. Two of these segments, designated 37 and 38, provide calendar time marks and are respectively connected through conductors 39 and 40 to a time marker unit 42. The segment 37 is energized from the time marker unit 42 once each hour and the segment 38 is energized once each day. Another segment 44 provides a mark when power has been restored to the receiver following a power failure and also provides a mark which may be induced by the central office so as to correlate the rotation of the switch 35 with respect to calendar time. In order to energize the segment 44 so as to provide a mark when power has been restored following a power failure, a conductor 45 is connected between the segment 44 and a power outage device 47. In order to energize the segment 44 in response to an induced time mark created at the central office, a conductor 41 is connected between the power outage device 47 and the control portion of the equipment. The induced time mark may be distinguished from the power outage mark, both of which would appear at the same place on the record, by sustaining the induced mark from the central office for a period which includes two complete passes of the wiper 46 of the switch 35, while energizing the segment 44 after a power outage for only one pass of the wiper 46. Two additional segments designated 48 and 49, respectively, provide a start or index mark on the record medium to indicate where each train of pulses begins and in which direction the wiper 46 is rotating. The latter information is provided by virtue of the fact that the segment 48 is considerably longer than any of the other segments on the selector switch.

The wiper arm 46 of the switch 35 is continuously driven for twenty-four hours per day at a constant speed by means of a suitable motor 52 which preferably rotates at a speed of one revolution per minute so that each receiver being monitored is checked once each minute, and there is thus provided a minute-to-minute record of the operating condition of each of the receivers. The provision of the marks by segments 48 and 49, one being longer than the other indicates not only the direction in which the wiper 46 is rotated but also serves to indicate that the record was made even though none of the receivers in any of the homes was energized during the recording period, thereby preventing false or misleading information from being obtained. From the above description it will be apparent that there is encoded on the record receiving medium, clock time, the "on" or "off" condition of the receiver as well as the tuning condition thereof.

As thus far described, it will be seen that as the wiper arm 46 is rotated by the motor 52 it engages each of the segments of the switch 35 in turn and a pulse of voltage is provided on the wiper for each energized segment which is contacted, the location with respect to time of each pulse being indicative of the particular segment which is energized.

Referring to Fig. 4, there is shown a series of waveforms or pulse trains of voltage which may appear on the wiper 46 during the normal operation thereof. In waveform A, the only pulses are a long pulse "*a*" immediately followed by a short or normal length pulse "*b*." Obviously, these are the index marks which occur as the wiper 46 moves across the segments 48 and 49. Since no other pulses appear in the waveform, none of the receivers is energized. Moreover, there are no time or power outage marks. In waveform B, there is an indication that TV–1 is energized and tuned to that channel corresponding to the energization of conductors 30 and 31. Consequently, in addition to the index marks there is a pulse "*c*" which occurs when the wiper 46 contacts the segment connected to the conductor 27 (TV-on) and pulses "*d*" and "*e*" occurring when the wiper 46 contacts the segments connected to the conductors 30 and 31. Since there are no other pulses which occur in this waveform, it is apparent that none of the other receivers in the home are energized nor has a power outage occurred during this interval.

In order to record this binary coded train of pulses for later transmission to the central office, the wiper 46 is connected through a conductor 54 and a resistor 55 to an amplifier 56 which provides a unidirectional output voltage signal across an output capacitor 58 for coupling via a conductor 59 to a recording head of the recorder and control unit 19. As shown, the amplifier 56 preferably comprises a thyratron 60 having a control grid 61 resistively coupled to the wiper 46, a cathode, and an anode 62 which is connected through the primary winding of a transformer 64 to a source 65 of full-wave rectified A.C. voltage energized from the main power lines 104 and 104*a*. A rectifying diode 66 is connected in series with the capacitor 58 across the secondary winding of the transformer 64. A train of pulses of suitable power for driving the recorder and control unit 19 is thus developed across the capacitor 58 in accordance with the condition of energization of the segments of the switch 35.

Referring now to Fig. 3, there is shown the control circuitry which is provided at each home for controlling the recording and playing back of the receiver operating condition pulses. During the recording period the signal developed across the capacitor 58 (Fig. 2) is coupled via the conductor 59 and a resistor 66 to the record and playback head 67 of a magnetic recorder 68. When the home is called by the central office and a predetermined signal is thereafter supplied to the home over the telephone lines from the central office, the record and playback head 67 is disconnected from across the capacitor 58 and connected to the input of an output amplifier, reshaper and filter 69 for feeding the playback signal to the telephone lines. At the same time the drive transmission 70 of the recorder 68 is reversed for high speed playback.

When all of the information in the recorder 68 has been played back, the telephone line circuit is interrupted, a power outage signal is induced on the segment 44 of the switch 35 (Fig. 2), and the record and playback head 67 is again connected across the capacitor 58. Since the calendar time of inducement of the power outage signal is known and recorded at the central office, the information recorded thereafter by the recorder 68 is correlated with respect to time.

The magnetic recorder 68 comprises a pair of supply and take-up reels 79 and 80 which are respectively tensioned by a pair of motors 82 and 83 to maintain a constant tension on a magnetic tape 84, thus insuring accuracy of recording of the train of pulses with respect to time. The tape 84 is driven by a suitable capstan 85 acting in conjunction with a pressure roller 86, the capstan 85 being driven by means of an A.C. drive motor 88 through the electrically controlled transmission 70. As previously indicated, the transmission 70 is constructed to provide a slow speed in the record direction and a fast speed in the playback direction. A plurality of suitably spaced idler wheels 90 guide the tape 84 across the capstan 85 and through the head gate which includes the record and playback head 67 and an erase head 92.

Preferably, the tape 84 is made of powdered iron or other magnetic material coated on a paper or plastic base. A tape width of about ¼ inch is suitable. The heads 67 and 92 may be identical and each consists of a magnetic circuit having an air gap of about .003 inch so that at least 26 pulses to the inch can be recorded. It will be observed from reference to Fig. 2 that since the selector switch 35 has twenty-six segments, the pulses in the train may repeat at the rate of twenty-six pulses per inch. Therefore, since twenty-six pulse positions must be provided per minute of listening, 120 feet of tape is necessary for each day of recording and the record speed may be made at approximately one inch per minute. This speed is, of course, controlled by the speed of rotation of the output shaft of the transmission 70 and the diameter of the capstan 85.

During the recording operation, which, in the embodiment of the invention illustrated in Fig. 3, occurs from left to right, the tape 84 moves at a slow speed but during playback the tape is driven at 8 inches per second from right to left and the playback pulse rate corresponds to two hundred pulses per second. Since, therefore, the recording rate is only twenty-six pulses per minute, playback occurs at about 500 times the speed during recording, and twenty-four hours of recording can be transmitted to the central office in about three minutes including the time required to make the connection and initiate operation of the playback system. Although not shown in the drawings, it will be understood that the erase head 92 is energized during playback so that the tape is erased before being returned to the supply reel 80.

Considering the remaining portions of the circuit shown in Fig. 3 in greater detail, an inductance device 95 is inductively coupled to the ringing circuit 96 of a telephone subset 97 in order to supply the induced ringing signal to an amplifier 98 which drives a tuned relay 100 tuned to the ringing frequency, thereby to cause the operation of a latching relay 102. The operation of latching relay 102 closes contact 103 and connects the voltage from a suitable power line 104 to a cradle switch operatnig solenoid 106 which operates the cradle switch 107 of the telephone subset thereby to complete the telephone circuit between the associated home and the central office which has made the call resulting in the ringing.

When the central office has heard the ringing signal cease, thus indicating that the telephone connection has been completed, it sends out over the line a start signal of some convenient frequency such as, for example 1200 cycles. The signal is picked up by an inductance device 108 which is magnetically coupled to an inductance coil 110 of the telephone subset and is coupled through a set of normally closed contacts 112 of a relay 113 to an amplifier 114 which operates a latching relay 116 through a tuned relay 117. The tuned relay 117 is tuned to 1200 cycles so that the relay 116 is only operated when the signal of predetermined frequency, namely, 1200 cycles, is picked up by the inductance coil 108. This prevents spurious operation of the system when the telephone subset 97 is accidentally called by an outside party. When the latching relay 116 is operated, its contact 111 is closed to operate the relay 113 and, hence, to disconnect the inductance coil 108 from the input circuit of the amplifier 114 and couple it through a set of normally open contacts 118 of the relay 113 to the output of the amplifier, reshaper, and filter 69. The magnetic head 67 of the tape recorder 68 is connected to the input of the amplifier 69 when a relay 115 is operated. It will be noted that the coil of the relay 115 is serially connected with the contacts 103 of the latching relay 102 and a set of normally open contacts 122 on the relay 113 between ground and the power line 104. Therefore, when the coil 108 picks up the 1200-cycle signal initiated at the central office, the relay 113 is energized to operate the relay 115 thereby to connect the magnetic head 67 to the inductance coil 108 through the amplifier 69 and through a set of normally open contacts 115*a* of the relay 115 for inducing the playback signal in the inductance coil 110 of the subset 97. Consequently, the pulses reproduced from the tape 84 are supplied over the telephone lines to the central office.

In addition to the set of normally open contacts 115*a* on the relay 115, which are connected between the head 67 and the amplifier 69, the relay 115 is provided with a set of normally closed contacts 126 and a set of normally open contacts 127 which are adapted to connect to ground a selected one of the terminals 128 and 129 of the transmission 70. When the relay 115 is released, terminal 128 is grounded and the tape 84 is driven at a slow speed in the forward or left-to-right direction, while operation of the relay 115 connects the terminal 129 to ground, so that the tape is driven at a high speed in the reverse direction.

In order to prevent complete unwinding of the tape 84 from either of the reels 79 or 80, switches 131 and 132 and an associated actuating arm 134 are provided. The arm 134 is pivotally mounted on a pintle 136 and biased as by gravity against the tape 84 which is wound on the reel 79 so as to open switch 131 when the reel 79 is full and to open switch 132 when the reel is almost empty. As shown, the motor 88 is serially connected with a selected one of the switches 131 and 132 across a suitable source of 115 volts A.C. The switches 131 and 132 are selectively connected in the circuit by the sets of contacts 140 and 141 of the relay 115. It may be desirable to energize the amplifiers 98, 114 and 69 at all times but it is possible to have the amplifiers 114 and 69 only energized after a ringing signal has been received to actuate the latching relay 102. This is a matter of design and will depend upon the particular application of the system, but in the circuit of Fig. 3 they are energized from the power line 104 at all times.

If the power to the home should fail during the playback operation, the solenoid 106 is deenergized thereby causing the cradle switch 107 to be opened. Obviously, if some person other than the central office rings this line, the cradle switch closes but no further action takes place until a time switch 147 having a pair of output terminals 148 connected across the holding contacts 149 and 150 of the latching relays 102 and 116 closes, thereby dropping out the relays 102 and 116 to open the switch 107 and break the telephone connection. A switch 151, which is adapted to be actuated by the arm 134 in the magnetic recorder 68 is also connected across the holding contacts 149 and 150 to break the telephone connection after all the tape 84 has been played back. Whenever either of the switches 147 or 151 operate to unlatch the relays 102 and 116, a signal is sent via a conductor 41 to the power outage device 47, thereby to provide an induced time mark on the tape.

For purposes of describing the present invention, the central office equipment may be assumed to be manually controlled and the call to each home is performed by an attendant who dials the number, turns on the 1200-cycle signal, and then starts the recorder 17 (Fig. 1) which is connected to a pick-up coil located at the central office phone. At the completion of the recording, the attendant marks the tape with a visual identification of the home number and the finish time, the finish time corresponding to the position of the induced power outage mark on the tape 84. Obviously, however, operation of the entire system may be initiated and controlled automatically by clock operated devices located at the central office, at the homes, or at both the central office and the homes.

Although the invention has been described in connection with one form of marketing research, namely, determining the listening and viewing habits of wave signal receiver users, it can be employed in connection with other marketing research activities. For example, groceries are being dispensed by vending machines and data may be recorded of the dispensing of certain commodities by such machines in much the same manner as the data with respect to receiver listening is recorded as described above. This data can then be transmitted from the vending machine location to the central office by the same equipment already described. The sale of gasoline at commercial establishments might be recorded in a similar manner.

While the invention has been described by particular embodiments thereof, it will be understood by those skilled in the art that many changes and modifications may be made without departing from the invention. Therefore, in the appended claims it is intended to cover all such changes and modifications as fall within the true spirit and scope of the invention.

What is claimed as new and is desired to be secured by Letters Patent of the United States is:

1. A system for monitoring the use of a plurality of wave signal receivers located at a plurality of different homes, comprising a magnetic recorder at each home, each of said magnetic recorders including a magnetic medium, transducing means disposed adjacent said medium, and drive means for moving said medium relative to said transducing means; first means for operating said drive means to move said magnetic medium relative to said transducing means at a first speed; means connected to and controlled by each of said receivers for providing control signals representing the operating condition of the associated receiver; a signal generator supplied with and controlled by said control signals for supplying data to said transducing means representing the operating condition of said receiver; means rendering said signal generator effective to supply data to said transducing means at fixed predetermined intervals; indicating means remote from said recorder; means for extending a signaling link between said indicating means and each of said magnetic recorders in sequence; and means operative when a magnetic recorder is connected to said link for connecting said transducing means to said signaling link, for rendering said first means ineffective, and for operating said drive means to move said magnetic medium relative to said transducing means at a second speed greater than said first speed.

2. A system for monitoring the use of a plurality of wave signal receivers located at a plurality of different homes, comprising a magnetic recorder at each home, each of said magnetic recorders including a magnetic medium, transducing means disposed adjacent said magnetic medium, and drive means for moving said medium relative to said transducing means; first means for operating said drive means to continuously move said magnetic medium relative to said transducing means; a continuously operative signal generator connected to said transducing means and controlled by one of said wave signal receivers for operating said transducing means to record time representing signals at regularly recurring positions on said medium and to record signals representing the operating condition of the receiver at locations between successive ones of said time representing signals; indicating means remote from said recorder; means for extending a signaling link between said indicating means and each of said magnetic recorders in sequence; and means for connecting said magnetic recorders to said indicating means over said link so that the time and operating condition representing signals are transmitted over said link to said indicating means.

3. In a system for determining the operating condition of a wave signal receiver, means at said receiver for encoding on a record receiving medium clock time, the "on" condition of said receiver and the tuning condition of said receiver, a recorder-reproducer of said codes located at said receiver for recording and reproducing said codes on and from said record receiving medium, signalling wires connected between the output of said recorder-reproducer at said receiver and a remote signalling point, means at said signalling point for remotely controlling said recorder-reproducer to reproduce the codes on said record receiving medium for transmission over said signalling wires, means at said remote signalling point for re-recording the codes as received over said signalling wires, and means for restoring said recorder-reproducer at the receiver to a condition to resume recording codes indicative of the receiver's operating condition as a function of clock time.

4. The system of claim 3 including means controlled by a signal initiated at said remote signalling point and sent over said signalling wires for operating said recorder-reproducer to reproduce the codes on said record receiving medium.

5. The system of claim 4 including means in said recorder-reproducer for moving said record receiving medium at high speeds whereby the record produced in a day may be reproduced in a few minutes at most.

6. The system of claim 4 wherein said record receiving medium is magnetic tape.

References Cited in the file of this patent

UNITED STATES PATENTS

| | | |
|---|---|---|
| 2,667,533 | Zenner | Jan. 26, 1954 |
| 2,674,512 | Bogert et al. | Apr. 6, 1954 |
| 2,755,161 | Rahmel | July 17, 1956 |
| 2,767,246 | Retallack | Oct. 16, 1956 |